United States Patent Office 2,928,851
Patented Mar. 15, 1960

2,928,851

6-METHYL-9α FLUORO DERIVATIVES OF HYDROCORTISONE AND CORTISONE AND 21-ESTERS THEREOF

George B. Spero, Kalamazoo, Mich., assignor to The Upjohn Company, Kalamazoo, Mich., a corporation of Michigan No Drawing. Application March 6, 1957
Serial No. 644,214

5 Claims. (Cl. 260—397.45)

The present invention relates to steroids and is more particularly concerned with 6-methyl-9α-fluorohydrocortisone, 6-methyl-9α-fluorocortisone, the 21-esters thereof and a process for the production thereof and the production of the Δ¹-analogue, 1-dehydro-6-methyl-9α-fluorohydrocortisone.

The present invention is a continuation-in-part of application Serial No. 624,965, filed November 29, 1956, and now abandoned.

The compounds and the process of the present invention are illustratively represented by the following sequence of formulae:

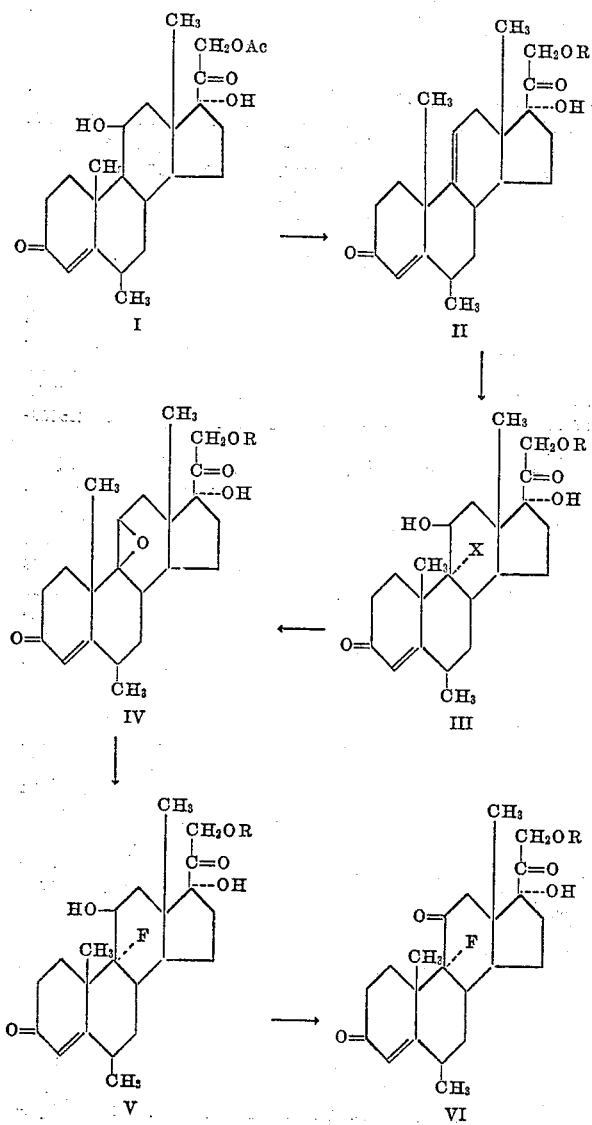

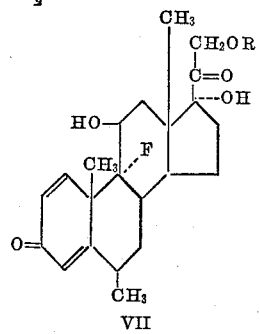

wherein X is a halogen of atomic number between seventeen and 37, inclusive, wherein Ac is the acyl radical of an organic carboxylic acid, preferably a hydrocarbon carboxylic acid containing from one to twelve carbon atoms, inclusive, and wherein R is selected from the group consisting of hydrogen and acyl, the acyl radical being defined as above.

The process of the present invention comprises: dehydrating a 6-methylhydrocortisone 21-acylate (I) illustratively with an acid, such as hydrochloric acid, sulfuric acid or with thionyl chloride or preferably, with an N-haloamide such as N-bromoacetamide and followed by treatment with anhydrous sulfur dioxide, to obtain the corresponding 6 - methyl -17α,21-dihydroxy-4,9(11)-pregnadiene-3,20-dione 21-ester (II); treating the thus-obtained 6-methyl - 17α,21 - dihydroxy-4,9(11)-pregnadiene-3,20-dione 21-acylate or the free alcohol, i.e., 6-methyl-17α,21-dihydroxy-4,9(11)-pregnadiene-3,20-dione which can be produced by hydrolysis of the ester under conventional conditions, with a hypohalous acid such as hypochlorous or hypobromous acid, preferably formed in situ, results in 6-methyl-9α-halo - 11β,17α,21 - trihydroxy-4-pregnene-3,20-dione 21-acylate or the free alcohol (III). Treatment of III with a mild base such as anhydrous potassium acetate yields the epoxy compound, 6-methyl-9β,11β-oxido-17α,21-dihydroxy-4-pregnene-3,20-dione 21-acylate or, respectively, the unesterified product, represented by Formula IV. Treatment of the epoxy compound (IV) with hydrogen fluoride or with hydrogen fluoride releasing agents provides the physiologically active fluoro derivative of Formula V, i.e., 6-methyl-9α-fluoro-11β,17α,21-trihydroxy-4-pregnene-3,20-dione 21-acylate or the free alcohol, 6-methyl-9α-fluoro-hydrocortisone. Oxidation of the esterified compound (V) with chromic acid provides the 6-methyl-9α-fluoro-17α,21-dihydroxy-4-pregnene-3,11,20-trione 21-acylate (VI). Hydrolysis of the ester VI with a base provides the free alcohol, 6-methyl-17α,21-dihydroxy-4-pregnene-3,11,20-trione (6-methyl-9α-fluorocortisone). Subjecting 6-methyl-9α-fluorohydrocortisone or the ester thereof to dehydrogenation either by micro-organisms such as Septomyxa or with selenium dioxide produces the Δ¹ analogue, 1-dehydro-6-methyl-9α-fluorohydrocortisone, or esters thereof. The same compounds V and VI may also be obtained by the alternate process shown in Example 13.

It is an object of the instant invention to provide the new adrenocortical hormones, 6-methyl-9α-fluorohydrocortisone, 6-methyl-9α-fluorocortisone and the 21-acylates thereof, in particular in the 6α-epimeric form. It is another object of the instant invention to provide a method for the production of 6-methyl-9α-fluorohydrocortisone, 6-methyl - 9α- fluorocortisone, the 21-esters thereof and 1-dehydro-6-methyl-9α-fluorohydrocortisone. It is an additional object of the instant invention to provide the intermediates for the production of these adrenocortically-active compounds, such as 6-methyl-17α,21-dihydroxy-4,9(11)-pregnadiene-3,20-dione 21-acylate, 6-methyl - 9(11)-oxido-17α,21-dihydroxy-4-pregnene-3,20-dione 21-acylate, the 9α-chloro- and 9α-bromo-6-methyl-11β,17α,21-trihydroxy-4-pregnene-3,20-dione 21-acylates and the free alcohols thereof. Other objects of this invention will be apparent to those skilled in the art to which this invention pertains.

The novel 6-methyl-9α-fluorohydrocortisone, the 6-methyl-9α-fluorocortisone and the 21-esters thereof, in particular the 6α-epimers thereof, i.e., 6α-methyl-9α-fluorohydrocortisone and 6α-methyl-9α-fluorocortisone, are very active adrenal cortical hormones. The glucocorticoid activity of the novel compound, 6α-methyl-9α-fluorohydrocortisone surpasses the glucocorticoid activity of the natural hormones, hydrocortisone and cortisone, and the novel compound possesses in addition anti-inflammatory activity of an extremely high order. The 6-methyl-9α-fluorohydrocortisone, the 6-methyl-9α-fluorocortisone and the 21-esters thereof are thus useful in parenteral and topical compositions and may be given as tablets for oral use in combination with such binding materials and carriers as polyethylene glycol 4000 or 6000, lactose, sucrose, and the like. Especially useful for this purpose is the 6α-methyl-9α-fluorohydrocortisone and esters thereof. In topical application the substances can be used as ointments, lotions, jellies, creams, suppositories, bougies, aqueous suspensions, and the like. Instead of the 6α-methyl-9α-fluorohydrocortisone or 6α-methyl-9α-fluorocortisone, the 6β-epimers thereof can be used in therapeutically equivalent amounts to give the same final results.

The 6α-methyl-9α-fluorohydrocortisone is also an important intermediate in the production of the extremely active 1-dehydro-6α-methyl-9α-fluorohydrocortisone as shown in Example 15. The 1-dehydro-6α-methyl-9α-fluorohydrocortisone was found to have a subcutaneous glucocorticoid activity between 108 and 127 times that of hydrocortisone, while the oral glucocorticoid activity was found to be 191 times that of hydrocortisone.

The starting material of the instant invention are the 6α-methylhydrocortisone ester as described in Preparations 1 through 10. Instead of the 6α-methylhydrocortisone, the 6β-epimer can be used to give the corresponding 6β-methyl-9α-fluorohydrocortisone and the 6β-methyl-9α-fluorocortisone.

In carrying out the process of the instant invention, 6-methyl-11β,17α,21-trihydroxy-4-pregnene - 3,20 - dione 21-acylate (6-methylhydrocortisone 21-acylate) is dehydrated to the corresponding 21-acylate of 6-methyl-17α,21-dihydroxy-4,9(11) - pregnadiene - 3,20 - dione by methods known in the art, for example, by a dehydrating agent such as phosphorus oxychloride, thionyl chloride, hydrochloric acid or sulfuric acid and acetic acid or by pyrolysis as shown by U.S. Patents 2,640,838 and 2,640,839. In the preferred embodiment of the present invention the dehydration is effected by reacting the 11β-hydroxy compound with a carboxylic acid N-haloamide or N-haloimide in an organic base and treating the thus produced intermediate 11-hypohalite with dry sulfur dioxide in an organic base. As reagents for the production of an 11-hypohalite, the acid N-haloamide or acid N-haloimide are used wherein the halogen has an atomic number from 17 to 53, inclusive, preferably chlorine or bromine. Examples of such compounds are N-chloroacetamide, N-bromoacetamide, N-chlorosuccinimide, N-bromosuccinimide, N-iodosuccinimide, 3-bromo-5,5-dimethylhydantoin and 1,3-dibromo-5,5-dimethylhydantoin, and the like. Ordinarily an amount in excess of a molar equivalent, calculated on the starting 11β-hydroxy steroid, is employed. The organic base employed as solvent in the production of the 11-hypohalite are tertiary amines wherein the amino nitrogen is a member of an aromatic ring, for example, the pyridines, that is, pyridine, alkyl-pyridines, piccoline, lutidine, collidine, conyrine, parvuline, or the like, or lower fatty amides such as formamide, methylformamide and dimethylformamide. The base is preferably employed in a large molar excess, calculated on the starting 11β-hydroxy steroid, for example, ten molar equivalents per mole of steroid, and is preferably the sole reaction solvent. The reaction to produce an 11-hypohalite is generally conducted under anhydrous conditions, preferably, containing less than 0.1 molar equivalent of water calculated per mole of steroid. Large proportions of water decrease the yield. The temperature of the reaction is between minus forty and plus seventy degrees centigrade, the lower limit being determined by the solubility of the reaction and solvents and the upper limit being determined by the amount of side reaction which normally accompanies the reaction involving any halo compounds at higher temperatures. Ordinarily, room temperature (twenty to thirty degrees centigrade) is preferred for convenience and because of the consistently high yields of the desired product which are obtained at this temperature. A reaction period between five minutes to three hours is usually employed; at higher temperatures—above thirty degrees centigrade—short reaction times are sufficient to effect completion of the reaction.

The thus produced 6-methyl-11β,17α,21-trihydroxy-4-pregnene-3,20-dione 11β-hypohalite, 21-acylate is then treated with anhydrous sulfur dioxide in the presence of an organic base as described hereinbefore. The anhydrous sulfur dioxide can be in the form of gaseous or liquid sulfur dioxide or in the form of a material which in situ produces sulfur dioxide, for example, alkali metal hyposulfite. The reaction temperature ranges substantially within minus forty and plus seventy degrees centigrade and preferably room temperature (twenty to thirty degrees centigrade). The thus obtained product a 6-methyl-17α,21-dihydroxy-4,9(11)-pregnadiene-3,20-dione 21-acylate is isolated from the reaction mixture by conventional means such as extraction after the reaction mixture has been poured into excess of water. Organic water-immiscible solvents such as ether, chloroform, methylene chloride, carbon tetrachloride, ethyl acetate, benzene, hexanes, or the like, are used for the extraction. The thus obtained extracts are conveniently washed, dried and thereupon evaporated to give the crude 6-methyl-17α,21-dihydroxy-4,9(11)-pregnadiene-3,20-dione 21-ester which is purified by conventional means such as recrystallization or chromatography, as deemed necessary.

The thus obtained 6-methyl-17α,21-dihydroxy-4,9(11)-pregnadiene-3,20-dione 21-acylate is converted to 6-methyl - 9α - halo - 11β,17α,21 - trihydroxy - 4-pregnene - 3,20-dione 21-acylate by adding a hypohalous acid such as hypochlorous or hypobromous acid. The hypohalous acid is usually added by reacting an N-haloacidamide or an N-haloacidimide with an acid to produce the hypohalous acid in situ. In the preferred embodiment of the invention, the steroid, a 6-methyl-17α,21-dihydroxy-4,9(11)-pregnadiene-3,20-dione 21-ester is dissolved in an organic solvent such as methylene chloride, tertiary butyl alcohol, dioxane, tertiary amyl alcohol, or the like, and reacted at room temperature with the hypobromous or hypochlorous acid releasing agent in the presence of an acid. Such hypohalous acid releasing agents include the N-bromoacetamide, the N-chloroacetamide, the N-bromosuccinimide, the N-iodosuccinimide, the N-chlorosuccinimide, or the like, in the presence of water and an acid such as perchloric acid, dilute sulfuric acid, or the like. The reaction is usually carried out at room temperature, between fifteen to thirty degrees centigrade, however, lower or higher temperatures are operative for the process. The hypohalous acid releasing agent is generally used in one molar or slightly increased, for example, 25 percent increased, amounts compared to mole of steroid. A large excess of the hypohalous acid releasing agent while operative is undesirable, since the excess of hypohalous acid has a tendency to react on other positions of the molecule. The reaction period is rather short and may vary between about four to five minutes to one hour. At the end of the reaction time excess of hypohalous acid is destroyed by the addition of sodium sulfite or other sulfites or hydrosulfites. The thus produced product, a 6 - methyl - 9α - halo - 11β,17α,21 - trihydroxy - 4 - pregnene-3,20-dione 21-acylate, wherein the halogen atom is of atomic weight between 33 and 130 (atomic number 17 to 53), is isolated from the reaction mixture by adding excess of water and extracting the compound with organic solvents or by recovering the precipitated compound through filtration. The crude product thus obtained may be recrystallized from organic solvents, such as acetone, Skellysolve B hexane hydrocarbons or the like to give pure 6-methyl-9α-halo-11β,17α,21-trihydroxy-4-pregnene-3,20-dione 21-acylate.

The ester thus obtained can be hydrolyzed in an acidic or neutral medium to give the free triol, 6-methyl-9α-halo-11β,17α,21-trihydroxy-4-pregnene-3,20-dione, which can be reesterified by known methods of esterification of 21-hydroxy steroids of the pregnane series.

Oxidizing the 21-ester of a 6-methyl-9α-halo-11β,17α,21-trihydroxy-4-pregnene-3,20-dione 21-acylate with chromic acid produces the corresponding pharmaceutically active 6 - methyl - 9α - halo - 17α,21 - dihydroxy - 4 - pregnene - 3,11,20-trione 21-acylate which by hydrolysis in an acidic or neutral medium gives the free triol 6-methyl-9α-halo-17α,21-dihydroxy-4-pregnene-3,11,20-trione.

In order to obtain the 9α-fluoro compounds, the 9β,11β-epoxy intermediates of the before-mentioned compounds, 6 - methyl - 9β,11β - oxido - 17α,21 - dihydroxy - 4 - pregnene-3,20-dione 21-esters, are prepared. In carrying out this reaction a 6-methyl-9α-halo-11β,17α,21-trihydroxy-4-pregnene-3,20-dione 21-ester wherein the halogen atom is of atomic number seventeen to 35, inclusive, is heated in solution with a mild base, and preferably in the absence of water to avoid hydrolysis of the ester groups.

The bases useful for the cyclization include anhydrous potassium acetate, sodium bicarbonate, sodium acetate, or the like, with potassium acetate preferred. Solvents such as methanol, ethanol, acetone, tertiary butyl alcohol, or the like, may be used. The reaction time is between one half hour and 24 hours; generally a period between three and twelve hours is sufficient. The thus obtained 6-methyl - 9β,11β - oxido - 17α,21 - dihydroxy - 4 - pregnene-3,20-dione 21-acylate is isolated from the reaction mixture by diluting the reaction mixture with excess water and filtering the product when crystalline, or by extracting with methylene chloride or other water-immiscible solvents such as ether, Skellysolve B hexanes, pentanes, benzene, ethyl acetate, methylene chloride, chloroform, carbon tetrachloride, or the like. Evaporation of the solvent of the extracts produces the 6-methyl-9β,11β - oxido - 17α,21 - dihydroxy - 4 - pregnene -3,20 - dione 21-acylate.

The thus obtained 6-methyl-9β,11β-oxido-17α,21-dihydroxy-4-pregnene-3,20-dione 21-acylate is thereupon reacted with hydrogen fluoride either as gas or liquified at low temperature or with 48 percent hydrofluoric acid in solution. As solvents for this reaction methylene chloride, ethylene dichloride, tetrahydrofuran, chloroform, carbon tetrachloride, or the like, is useful. The reaction may be carried out at room temperature (twenty to thirty degrees centigrade) or, in the preferred embodiment of the invention, in tetrahydrofuran at low temperature, e.g., zero to minus eighty degrees centigrade with stirring. The period of reaction is from one to 24 hours with a period from one to twelve hours usually sufficient. After the reaction is terminated, the mixture is poured into water and neutralized with a dilute base, e.g., sodium or potassium hydroxide or carbonate or a bicarbonate such as sodium bicarbonate, potassium bicarbonate, or the like. The reaction mixture is then extracted with a water-immiscible solvent such as methylene chloride, the organic layer is separated from the water mixture, washed with water, dried and evaporated to give the crude 6-methyl-9α - fluoro - 11β,17α,21 - trihydroxy - 4-pregnene - 3,20 - dione 21-acylate. The thus obtained crude compound may be purified through recrystallization or chromatography.

The 6-methyl-9α-fluoro-11β,17α,21-trihydroxy-4-pregnene-3,20-dione 21-esters obtained by this process can be hydrolyzed with a base or acid in conventional manner to give the 6-methyl-9α-fluoro-11β,17α,21-trihydroxy-4-pregnene-3,20-dione which can be re-esterified, if desired, with acyl halides or acid anhydrides, in pyridine solution at room temperature to give other 21-esters thereof.

Oxidation of the 6-methyl-9α-fluoro-11β,17α,21-trihydroxy-4-pregnene-3,20-dione 21-acylate with chromic acid produces the corresponding 6-methyl-9α-fluoro-17α,21-dihydroxy-4-pregnene-3,11,20-trione 21-acylate which can be hydrolyzed illustratively with a base, e.g., with sodium carbonate in ethanol in a nitrogen atmosphere to give the free diol, 6-methyl-9α-fluoro-17α,21-dihydroxy-4-pregnene-3,11,20-trione.

The dehydrogenation of 6-methyl-9α-fluoro-11β,17α,21-trihydroxy-4-pregnene-3,20-dione to obtain the Δ¹-analogue thereof is carried out either by fermentative or chemical dehydrogenation. Microorganisms such as Septomyxa, Corynebacterium, Fusarium, and the like, are used under fermentation conditions well known in the art (e.g., U.S. 2,602,769) and furthermore illustrated by Example 14 herein. In case of the use of Septomyxa it was found to be advantageous to use with the substrate and medium a steroid promoter, such as progesterone, 3-ketobisnor-4-cholen-22-al, 3-ketobisnorcholenic acid, 11β,21-dihydroxy-1,4,17(20)-pregnatrien-3-one, and the like. The chemical dehydrogenation can be carried out with selenium dioxide as illustrated in detail by Example 15.

The following preparations and examples are illustrative of the process and products of the present invention, but are not to be construed as limiting.

PREPARATION 1

*5α,6α-oxido-11β,17α,21-trihydroxyallopregnane-3,20-dione 3,20-bis-(ethylene ketal)*

To a solution of 0.901 gram of 11β,17α,21-trihydroxy-5-pregnene-3,20-dione 3,20-bis-(ethylene ketal) in eighteen milliliters of chloroform was added a solution of 331 milligrams of perbenzoic acid in 5.19 milliliters of chloroform. The resulting solution was allowed to stand in the refrigerator (ca. four degrees centigrade) for a period of 24 hours and thereupon at room temperature for an additional period of 72 hours. The reaction solution was then washed with five percent sodium bicarbonate solution and water, dried over anhydrous sodium sulfate and evaporated to dryness to give 1.031 grams of crude solid. Recrystallization from acetone gave 431 milligrams of material of melting point 230 to 247 degrees centigrade. The mother liquor, after evaporation to dryness, was dissolved in methylene chloride and chromatographed over 25 grams of acid washed alumina. The column was developed with three fractions each of methylene chloride plus five, ten, fifteen, twenty, 25 and fifty percent acetone, acetone, and acetone plus five percent methanol. The acetone plus five percent methanol eluate gave an additional 279 milligrams of the high melting product. The high melting material, 5α,6α-oxido-11β,17α,21-trihydroxyallopregnane-3,20-dione 3,20-bis-(ethylene ketal) was three times recrystallized from acetone and methanol to give a pure product of melting point 263 to 268 degrees centigrade. Other eluate fractions of lower melting point contained the 5β,6β-isomer thereof.

In the same manner as shown in Preparation 1, other 5α,6α - oxido - 11β,17α,21 - trihydroxyallopregnane-3,20-dione 3,20-bis-(alkylene ketals) can be prepared by reacting hydrocortisone diketals, wherein the ketal group has been formed, by reacting the steroid 3,20-dione with ethylene, propylene, 1,2-, 1,3-, or 2,3-butylene glycol or pentane, hexane, heptane, or octane-diols wherein the alcohol groups are in vicinal positions such as 1,2, 2,3, 3,4, or the like, or separated by one carbon atom such as 1,3, 2,4, 3,5, and the like, with an organic peracid such as performic, peracetic, perbenzoic, monoperphthalic acid, or the like. For the purpose of this invention, starting compounds having the ethylene ketal groups are preferred, since these ketals are generally more easily prepared in high yield than ketals produced by the reaction of the 3,20-diketo compounds with higher alkanediols.

PREPARATION 2

$5\alpha,11\beta,17\alpha,21$-tetrahydroxy-$6\beta$-methylallopregnane-3,20-dione 3,20-bis-(ethylene ketal)

A solution of 1.115 grams of $5\alpha,6\alpha$-oxido-$11\beta,17\alpha,21$-trihydroxyallopregnane - 3,20 - dione 3,20-bis-(ethylene ketal) in 165 milliliters of tetrahydrofuran (the tetrahydrofuran being dried through distillation over lithium aluminum hydride) was added dropwise to a solution of 95 milliliters of methyl magnesium bromide in ether (the magnesium bromide having a four molar concentration). To this mixture was added 575 milliliters of benzene and the reaction mixture was thereupon allowed to stir and reflux for 26 hours. After cooling, the reaction mixture was poured into 700 milliliters of iced, saturated ammonium chloride solution, stirred for a period of thirty minutes, and the benzene layer separated from the aqueous layer. The aqueous phase was extracted with three 200-milliliter portions of ethyl acetate and the extracts added to the benzene layer. The combined benzene-ethyl acetate solution was thereupon washed with water, dried over anhydrous sodium sulfate and evaporated to dryness to give 1.314 grams of crude solid. Trituration of this material with ether left 1.064 grams of crystalline product of melting point 221 to 230 degrees. Recrystallization of this material gave $5\alpha,11\beta,17\alpha,$ 21-tetrahydroxy-$6\beta$-methylallopregnane-3,20-dione 3,20-bis-(ethylene ketal) of melting point 228 to 233 degrees and rotation $[\alpha]_D$ minus eleven degrees in chloroform.

Analysis.—Calcd. for $C_{26}H_{42}O_8$: C, 64.70; H, 8.77. Found: C, 64.29; H, 8.69.

PREPARATION 3

$5\alpha,11\beta,17\alpha,21$-tetrahydroxy-$6\beta$-ethylallopregnane-3,20-dione 3,20-bis-(ethylene ketal)

In the same manner as shown in Preparation 2, $5\alpha,6\alpha$-oxido-$11\beta,17\alpha,21$-trihydroxyallopregnane-3,20-dione 3,20-bis-(ethylene ketal) was reacted with ethyl magnesium bromide in ether solution to give the corresponding $5\alpha,$ $11\beta,17\alpha,21$ - tetrahydroxy - $6\beta$ - ethylallopregnane - 3,20-dione 3,20-bis-(ethylene ketal).

In the same manner as shown in Preparations 2 and 3, other $5\alpha,11\beta,17\alpha,21$-tetrahydroxy-$6\beta$-alkylallopregnane-3,20-dione 3,20-bis-(ethylene ketals) are prepared by reacting the corresponding $5\alpha,6\alpha$-oxido-$11\beta,17\alpha,21$-trihydroxy-allopregnane-3,20-dione 3,20-bis-(ethylene ketal) with a metal alkyl or metal aryl more specifically an alkyl metal halide such as a Grignard reagent, for example, methyl, ethyl, propyl, isopropyl, butyl, isobutyl, pentyl, hexyl, and phenyl magnesium bromides and iodides or cadmium alkyl and calcium alkyl and phenyl bromides or iodides. Representative $6\beta$-alkylated allopregnanes thus prepared include:

$5\alpha,11\beta,17\alpha,21$ - tetrahydroxy - $6\beta$ - propylallopregnane-3,20-dione 3,20-bis-(ethylene ketal), $5\alpha,11\beta,17\alpha,21$ - tetrahydroxy - $6\beta$ - butylallopregnane-3,20-dione 3,20-bis-(ethylene ketal), $5\alpha,11\beta,17\alpha,21$ - tetrahydroxy - $6\beta$ - isobutylallopregnane-3,20-dione 3,20-bis-(ethylene ketal), $5\alpha,11\beta,17\alpha,21$ - tetrahydroxy - $6\beta$ - pentylallopregnane-3,20-dione 3,20-bis-(ethylene ketal), $5\alpha,11\beta,17\alpha,21$ - tetrahydroxy - $6\beta$ - hexylallopregnane-3,20-dione 3,20-bis-(ethylene ketal), $5\alpha,11\beta,17\alpha,21$ - tetrahydroxy - $6\beta$ - phenylallopregnane-3,20-dione 3,20-bis-(ethylene ketal), and the like.

PREPARATION 4

$5\alpha,11\beta,17\alpha,21$-tetrahydroxy-$6\beta$-methylallopregnane-3,20-dione A solution was prepared containing 468 milligrams of $5\alpha,11\beta,17\alpha,21$ - tetrahydroxy - $6\beta$ - methylallopregnane-3,20-dione 3,20-bis-(ethylene ketal), 38 milliliters of methanol and 7.7 milliliters of 2N sulfuric acid. This solution was refluxed for a period of thirty minutes, then neutralized with five percent dilute sodium bicarbonate solution (about 100 milliliters) and concentrated under reduced pressure at 55 degrees centigrade to about 35 milliliters of volume. A product crystallized upon cooling and was recovered by filtration. This product was recrystallized from acetone-Skellysolve B hexanes to give an analytical pure sample of $5\alpha,11\beta,17\alpha,21$-tetrahydroxy-$6\beta$-methylallopregnane-3,20-dione of melting point 240 to 244 (decomposition) and rotation $[\alpha]_D$ plus forty degrees in dioxane.

Analysis.—Calcd. for $C_{22}H_{34}O_6$: C, 66.98; H, 8.69. Found: C, 66.84; H, 8.86.

PREPARATION 5

$5\alpha,11\beta,17\alpha,21$-tetrahydroxy-$6\beta$-ethylallopregnane-3,20-dione In the same manner as shown in Preparation 4, $5\alpha,11\beta,17\alpha,21$ - tetrahydroxy - $6\beta$ - ethylallopregnane-3,20-dione 3,20-bis-(ethylene ketal) was hydrolyzed with dilute sulfuric acid in ethanol solution to give $5\alpha,11\beta,17\alpha,$ 21 - tetrahydroxy - $6\beta$ - ethylallopregnane - 3,20 - dione.

In the same manner as shown in Preparations 4 and 5, hydrolysis of other $5\alpha,11\beta,17\alpha,21$-tetrahydroxy-$6\beta$-alkylallopregnane-3,20-dione 3,20-bis-(ethylene ketal), as well as those $6\beta$-alkylallopregnane-3,20-dione 3,20-bis-(ketals) wherein the ketal group is other than ethylene, gives the corresponding $5\alpha,11\beta,17\alpha,21$ - tetrahydroxy - $6\beta$ - alkylallopregnane-3,20-diones, such as for example, $5\alpha,11\beta,17\alpha,21$ - tetrahydroxy - $6\beta$ - propylallopregnane-3,20-dione, $5\alpha,11\beta,17\alpha,21$ - tetrahydroxy - $6\beta$ - butylallopregnane-3,20-dione, $5\alpha,11\beta,17\alpha,21$ - tetrahydroxy - $6\beta$ - isobutylallopregnane-3,20-dione, $5\alpha,11\beta,17\alpha,21$ - tetrahydroxy - $6\beta$ - pentylallopregnane-3,20-dione, $5\alpha,11\beta,17\alpha,21$ - tetrahydroxy - $6\beta$ - hexylallopregnane-3,20-dione, $5\alpha,11\beta,17\alpha,21$ - tetrahydroxy - $6\beta$ - phenylallopregnane-3,20-dione, and the like.

PREPARATION 6

$6\alpha$-methylhydrocortisone

A stream of nitrogen was bubbled through a solution of 429 milligrams of $5\alpha,11\beta,17\alpha,21$-tetrahydroxy-$6\beta$-methylallopregnane-3,20-dione, contained in 100 milliliters of denatured absolute alcohol, for a period of ten minutes. To this solution was added 4.3 milliliters of 0.1 normal sodium hydroxide solution which had likewise been treated with nitrogen. The mixture was allowed to stand in a nitrogen atmosphere for a period of eighteen hours and thereupon was acidified with acetic acid, and concentrated under reduced pressure at 55 degrees centigrade to dryness. The residue weighing 417 milligrams was recrystallized from acetone-Skellysolve B hexanes to give in two crops 249 milligrams of $6\alpha$-methylhydrocortisone melting between 184 and 194 degrees centigrade. An analytical sample was prepared melting at 203 to 208 degrees centigrade and consisting of $6\alpha$-methylhydrocortisone.

*Analysis.*—Calcd. for $C_{22}H_{32}O_5$: C, 70.18; H, 8.57. Found: C, 70.32; H, 8.50.

The mother liquors contained besides 6α-methylhydrocortisone, substantial amounts of 6β-methylhydrocortisone which can be isolated by recrystallization, paper-gram, countercurrent procedures and other means known in the art.

Esterification of 6α-methylhydrocortisone with acetic anhydride in pyridine at room temperature yielded 6α-methylhydrocortisone 21-acetate of melting point 213 to 214 degrees centigrade.

*Analysis.*—Calcd. for $C_{24}H_{34}O_6$: C, 68.87; H, 8.19. Found: C, 68.60; H, 8.41.

PREPARATION 7

6β-methylhydrocortisone

A solution was prepared containing 27.5 grams of 5α,11β,17α,21 - tetrahydroxy - 6β - methylallopregnane-3,20-dione in 6500 milliliters of ethanol denatured with methanol. The solution was freed of air oxygen by bubbling oxygen-free nitrogen through it for a period of fifteen minutes. To this solution was added a similarly air oxygen-free prepared solution of one-tenth normal sodium hydroxide (235 milliliters). The solution was allowed to stand at room temperature (about 22 to 24 degrees centigrade) in an inert nitrogen atmosphere for a period of twenty hours and was then acidified with fourteen milliliters of acetic acid. The thus obtained acid solution was evaporated at about fifty to sixty degrees centigrade in vacuo, the thus produced residue dissolved in 200 milliliters of ethyl acetate and 200 milliliters of water, the water layer separated from the organic layer and discarded, the organic layer washed with 350 milliliters of five percent aqueous sodium bicarbonate solution, then three times with water and thereupon dried over anhydrous sodium sulfate and concentrated to a volume of 180 milliliters. After cooling the 180 milliliters of solution in a refrigerator (about five degrees centigrade), the solution was filtered giving 11.9 grams of material. This material was redissolved in 500 milliliters of ethyl acetate, the ethyl acetate solution was concentrated to 150 milliliters, refrigerated as before to give 6.15 grams of crude 6β-methylhydrocortisone of melting point 220 to 223 degrees centigrade.

Recrystallization of the crude 6β-methylhydrocortisone three more times from ethyl acetate gave an analytical sample of 6β-methylhydrocortisone with melting point 223 to 227 degrees centigrade, rotation $[\alpha]_D$ plus 105 degrees in acetone; ultraviolet absorption $$\lambda_{max}^{95\%} \text{ ethanol } 243 \text{ m}\mu; \ a_M = 14{,}500$$

*Analysis.*—Calcd. for $C_{22}H_{32}O_5$: C, 70.17; H, 8.57. Found: C, 70.54; H, 8.91.

PREPARATION 8

6α-ethylhydrocortisone

In the same manner as shown in Preparation 6, 5α,11β,17α,21 - tetrahydroxy - 6α - ethylallopregnane-3,20-dione was treated with a solution of potassium hydroxide in methanol to give at room temperature 6α-ethylhydrocortisone of melting point 223 to 226 degrees centigrade and $$\lambda_{max}^{EtOH} 243; \ \epsilon14{,}525$$

In the same manner dehydrating with an alkali metal hydroxide in alcoholic solution other 5α,11β,17α,21-tetrahydroxy-6β-alkylallopregnane-3,20-diones produced the corresponding 6α-alkyl- and 6α-aryl-11β,17α,21-trihydroxy-4-pregnene-3,20-diones such as 6α-propylhydrocortisone, 6α-butylhydrocortisone, 6α-isobutylhydrocortisone, 6α-pentylhydrocortisone, 6α-hexylhydrocortisone, 6α-phenylhydrocortisone, and the like.

PREPARATION 9

6α-methylhydrocortisone acetate

A mixture was prepared containing one gram of 6α-methylhydrocortisone in five milliliters of pyridine and five milliliters of acetic anhydride. The mixture was maintained at room temperature (22 to 24 degrees centigrade) for a period of six hours, thereupon poured into 100 milliliters of ice water and the resulting aqueous mixture extracted with three 25-milliliter portions of methylene chloride. The combined methylene chloride solutions were washed, dried over sodium sulfate and evaporated and the thus obtained residue recrystallized three times from acetone-Skellysolve B hexanes to give pure 6α-methylhydrocortisone 21-acetate (6α-methyl-11β, 17α - dihydroxy - 21-acetoxy-4-pregnene-3,20-dione) of melting point 213 to 214 degrees centigrade.

PREPARATION 10

In the same manner as given in Example 9, treating in pyridine solution:

(a) 6α-methylhydrocortisone with propionic anhydride yielded 6α-methylhydrocortisone 21-propionate.

(b) 6α-methylhydrocortisone with butyric anhydride yielded 6α-methylhydrocortisone 21-butyrate.

(c) 6α-methylhydrocortisone with valeric anhydride yielded 6α-methylhydrocortisone 21-valerate.

(d) 6α-methylhydrocortisone with hexanoyl bromide yielded 6α-methylhydrocortisone 21-hexanoate.

(e) 6α-methylhydrocortisone with octanoyl chloride yielded 6α-methylhydrocortisone 21-octanoate.

(f) 6α-methylhydrocortisone with benzoyl chloride yielded 6α-methylhydrocortisone 21-benzoate.

(g) 6α-methylhydrocortisone with phenylacetyl chloride yielded 6α-methylhydrocortisone 21-phenylacetate.

(h) 6α-ethylhydrocortisone with acetic anhydride yielded 6α-ethylhydrocortisone acetate.

In a manner similar to Preparations 9 and 10, other starting materials can be made by esterifying 6-alkylhydrocortisone or 6-arylhydrocortisone in pyridine solution with acyl halides or acid anhydrides. Starting materials thus prepared include the acetates, propionates, butyrates, isobutyrates, valerates, isovalerates, hexanoates, heptanoates, octanoates, benzoates, phenylacetates, β-cyclopentylpropionates, phenylpropionates, laurates, hemisuccinates, tartrates, maleates, toluenesulfonates, and the like of 6-alkylhydrocortisone and 6-arylhydrocortisone wherein the alkyl group is methyl, ethyl, propyl, butyl, pentyl, or hexyl and the aryl group may be phenyl or the like.

EXAMPLE 1

6α-methyl-17α,21-dihydroxy-4,9(11)-pregnadiene-3,20-dione 21-acetate

To a solution of 8.5 grams of 6α-methyl-11β,17α,21-trihydroxy-4-pregnene-3,20-dione 21-acetate (6α-methylhydrocortisone 21-acetate) in 42.5 milliliters of pyridine was added 5.63 grams of N-bromoacetamide. After standing at room temperature for a period of fifteen minutes, the reaction solution was cooled to five to ten degrees centigrade and, with shaking, sulfur dioxide gas was passed over the surface until the solution gave no color with acidified starch-iodide paper. During the addition of sulfur dioxide gas, the reaction became warm. The temperature was kept under thirty degrees centigrade by external cooling and by varying the rate of sulfur dioxide addition. Thereafter to the reaction mixture 400 milliliters of ice water was added and the resulting precipitate collected by filtration. This material was recrystallized from acetone-Skellysolve B hexanes to give 5.78 grams of 6α-methyl-17α,21-dihydroxy-4,9(11)-pregnadiene-3,20-dione 21-acetate of melting point 165 to 169 degrees centigrade. The mother liquors were evaporated to a partly crystalline residue which weighed 1.82 grams. This material was dissolved in methylene chloride and chromatographed on 75 grams of Florisil. The column was eluted with 2000 milliliters of 8% acetone-92% Skellysolve B and 1000 milliliters of 15% acetone-85% Skellysolve B. The eluant was collected in 200-milliliter fractions. Fractions 3 to 7 were combined, evaporated, and the residue recrystallized from acetone-Skellysolve B hexanes to yield 0.88 gram of 6α-methyl-17α,21-dihydroxy-4,9(11)-pregnadiene-3,20-dione 21-acetate of melting points 169–172 degrees centigrade. The combined yield therefore was 6.66 grams or 82.4 percent. An analytical sample obtained by crystallization from acetone-Skellysolve B hexanes gave 6α-methyl-17α,21-dihydroxy-4,9(11)-pregnadiene-3,20-dione 21-acetate of melting point 175–176 degrees centigrade and rotation $[\alpha]_D$ plus 91 degrees in chloroform.

Analysis.—Calcd. for $C_{24}H_{32}O_5$: C, 71.94; H, 8.05. Found: C, 71.75; H, 7.71.

EXAMPLE 2

6α-methyl-9α-bromo-11β,17α,21-trihydroxy - 4 - pregnene-3,20-dione 21-acetate (6α-methyl-9α-bromohydrocortisone 21-acetate)

To a solution of 5.68 grams of 6α-methyl-17α,21-dihydroxy-4,9(11)-pregnadiene-3,20-dione 21-acetate in 100 milliliters of methylene chloride and 250 milliliters of teriary butyl alcohol was added a solution of fourteen milliliters of 72 percent perchloric acid in 100 milliliters of water followed by a solution of 2.34 grams of N-bromoacetamide in sixty milliliters of tertiary butyl alcohol. After stirring the reaction mixture for fifteen minutes, a solution of 2.8 grams of sodium sulfite in 140 milliliters of water was added and the reaction mixture was concentrated to a volume of about 500 milliliters under reduced pressure at about fifty degrees centigrade. At this point crystallization started. The concentrate was cooled in an ice bath and while stirring 500 milliliters of water was added. After stirring for a period of one hour, the crystalline product was isolated by filtration, the crystals were washed with water and air-dried to give 6.88 grams (98.9% yield) of 6α-methyl-9α-bromo-11β,17α,21-trihydroxy-4-pregnene-3,20-dione 21-acetate (6α-methyl-9α-bromohydrocortisone 21-acetate) of melting point 159 to 161 degrees centigrade (with decomposition). An analytical sample was obtained from dilute acetone of melting point 153–155 and rotation $[\alpha]_D$ plus 148 degrees in chloroform.

Analysis.—Calcd. for $C_{24}H_{33}O_6Br$: Br, 16.07. Found: Br, 16.01.

EXAMPLE 3

6α-methyl-9β,11β-oxido-17α,21-dihydroxy-4-pregnene-3,20-dione 21-acetate

To a solution of 6.78 grams of 6α-methyl-9α-bromo-11β,17α,21-trihydroxy-4-pregnene-3,20-dione 21-acetate in 175 milliliters of acetone was added 6.78 grams of potassium acetate and the resulting suspension was heated under reflux for a period of seventeen hours. The mixture was then concentrated to approximately sixty milliliters of volume at reduced pressure on the steam bath and thereupon diluted with water and extracted with methylene chloride. The methylene chloride extracts were combined, washed with water, dried over anhydrous sodium sulfate and evaporated. The residue was redissolved in methylene chloride and chromatographed over 200 grams of Florisil anhydrous magnesium silicate. The column was eluted with 1050 milliliters of five percent acetone–95% Skellysolve B hexanes, 1750 milliliters of eight percent acetone–92% Skellysolve B, 3500 milliliters of ten percent acetone–90% Skellysolve B and 350 milliliters of acetone. The eluant was collected in 350-milliliter fractions. Fractions 6–16 contained 4.981 grams (88.1% yield) of totally crystalline material. This material was used without further purification in the next step. An analytical sample of 6α-methyl-9β,11β-oxido-17α,21-dihydroxy-4-pregnene-3,20-dione 21-acetate, obtained by recrystallization of a portion of the peak fraction from acetone-Skellysolve B hexanes, had a melting point of 180 to 182 degrees centigrade and rotation $[\alpha]_D$ of plus 65 degrees in chloroform.

Analysis.—Calcd. for $C_{24}H_{32}O_6$: C, 69.20; H, 7.75. Found: C, 69.41; H, 7.93.

EXAMPLE 4

6α-methyl-9α-fluoro-11β,17α,21-trihydroxy - 4 - pregnene-3,20-dione 21-acetate (6α-methyl-9α-fluorohydrocortisone 21-acetate)

To approximately 1.3 grams of hydrogen fluoride contained in a polyethylene bottle and maintained at minus sixty degrees centigrade was added 2.3 milliliters of tetrahydrofuran and then a solution of 500 milligrams (0.0012 mole) of 6α-methyl-9β,11β-oxido-17α,21-dihydroxy-4-pregnene-3,20-dione 21-acetate (combined chromatographic fractions in two milliliters of methylene chloride). The steroid solution was rinsed in with an additional one milliliter of methylene chloride. The light red colored solution was then kept at approximately minus thirty degrees centigrade for one hour and at minus ten degrees for two hours. At the end of this period it was mixed cautiously with an excess of cold sodium bicarbonate solution and the organic material extracted with the aid of additional methylene chloride. The combined extracts were washed with water, dried over anhydrous sodium sulfate and concentrated to approximately 35 milliliters of volume. This solution was chromatographed over forty milliliters of Florisil anhydrous magnesium silicate. The column was diluted with 400 milliliters of seven percent acetone–93% Skellysolve B hexanes, 500 milliliters of 10% acetone–90% Skellysolve B, 1000 milliliters of twelve percent acetone–88% Skellysolve B hexanes and 100 milliliters of acetone. The eluant was collected in 100-milliliter fractions. Fractions 11 through 17 were combined and evaporated to give a total of 439 milligrams (84.2%) of crystalline product. Recrystallization from acetone-Skellysolve B gave two crops: 0.23 gram of melting point 218 to 220 degrees centigrade and 0.16 gram of melting point 201 to 208 degrees centigrade. Total yield 74.7%. An analytical sample was obtained from ethyl acetate Skellysolve B hexanes as needles of pure 6α-methyl-9α-fluorohydrocortisone 21-acetate of melting point 219 to 220 degrees centigrade and rotation $[\alpha]_D$ plus 113 degrees in acetone.

Analysis.—Calcd. for $C_{24}H_{33}O_6F$: C, 66.03; H, 7.62; F, 4.35. Found: C, 65.69; H, 7.49; F, 4.29.

EXAMPLE 4a

6α-methyl-9α-fluoro-11β,17α,21-trihydroxy - 4 - pregnene-3,20-dione 21-acetate (Alternate procedure)

A solution was prepared of 250 milligrams of 6α-methyl-9β,11β-oxido-17α,21-dihydroxy-4-pregnene-3,20 - dione 21-acetate in five milliliters of methylene chloride and thereto was added one milliliter of 48 percent solution of aqueous hydrogen fluoride. The two-phase mixture was stirred for a period of twenty hours, then diluted with fifteen milliliters of methylene chloride and carefully poured into forty milliliters of water conatining 3.5 grams of sodium bicarbonate. After shaking to neutralize the excess hydrogen fluoride, the methylene chloride was separated and the water phase was extracted with more methylene chloride. The combined methylene chloride solution (about 75 milliliters) was dried over anhydrous sodium sulfate, diluted with 25 milliliters of ether and chromatographed over twenty grams of Florisil synthetic magnesium silicate. The column was eluted as follows:

TABLE I

| Fraction No. | Solvent |
| --- | --- |
| 1 (100 milliliters) | Methylene chloride-ether (3:1). |
| 2-6 (40 milliliters each) | Skellysolve B hexane plus acetone (12%). |
| 7-16 (40 milliliters each) | Skellysolve B hexane plus acetone (15%). |
| 17-21 (40 milliliters each) | Skellysolve B hexane plus acetone (20%). |
| 22-26 (40 milliliters each) | Skellysolve B hexane plus acetone (25%). |
| 27-30 (40 milliliters each) | Skellysolve B hexane plus acetone (50%). |

Fractions 3 to 13, inclusive, were combined, evaporated and the residue thus obtained recrystallized from ethyl acetate-Skellysolve B hexane and from methylene chloride to give 95 milligrams of 6α-methyl-9α-fluoro-11β,17α,21-trihydroxy-4-pregnene-3,20-dione 21-acetate.

EXAMPLE 5

*6α - methyl - 9α - fluoro - 17α,21 - dihydroxy-4-pregnene-3,11,20-trione 21-acetate (6α-methyl-9α-fluorocortisone 21-acetate)*

A solution was prepared containing in one milliliter of acetic acid fifty milligrams of 6α-methyl-9α-fluoro-11β,17α,21-trihydroxy-4-pregnene-3,20-dione 21-acetate, twenty milligrams of chromic anhydride and one drop (approximately fifty milligrams) of water. This mixture was shaken several times at room temperature and allowed to stand for four hours. Thereafter it was poured into ten milliliters of water and refrigerated for twenty hours at about five degrees centigrade. The steroid which separated from the aqueous mixture was collected on filter paper and recrystallized three times from acetone to give 6α-methyl-9α-fluoro-17α,21-dihydroxy-4-pregnene-3,11,20-trione 21-acetate (6α-methyl-9α-fluorocortisone 21-acetate).

In the same manner as given in Examples 1 through 5 but using as starting material the corresponding 6β-isomers are obtained 6β-methyl-9α-fluoro-11β,17α,21-trihydroxy-4-pregnene-3,20-dione 21-acetate and 6β-methyl-9α-fluoro-17α,21-dihydroxy-4-pregnene-3,11,20-trione 21-acetate. Using instead of the acetates, other esters as starting materials in the series exemplified by Examples 1 through 5, such as propionate, butyrate, isobutyrate, valerate, benzoate, hexanoate, heptanoate, octanoate, phenylacetate, phenylpropionate, laurate, or the like of 6α- or 6β-methyl-hydrocortisone yields the corresponding esters of 6α- or 6β-methyl-9α-fluorohydrocortisone and -cortisone. Instead of the 6α-methylhydrocortisone, 6α-alkyl- and 6-arylhydrocortisones can be used to give by the sequence of steps illustrated in Examples 1 through 5 the corresponding 6α-alkyl-9α-fluorohydrocortisone esters and the 11-keto analogues, i.e., 6α-alkyl-9α-fluorocortisone esters and 6α-aryl-9α-fluorocortisone esters, wherein the alkyl groups can be ethyl, propyl, isopropyl, butyl, isobutyl, pentyl, hexyl, and the aryl group can be phenyl, benzyl, or the like.

EXAMPLE 6

*6α-methyl-9α-fluoro-11β,17α,21-trihydroxy-4-pregnene-3,20-dione (6α-methyl-9α-fluorohydrocortisone)*

Three and one quarter (3.25) grams of 6α-methyl-9α-fluoro-11β,17α,21-trihydroxy-4-pregnene - 3,20 - dione 21-acetate were dissolved in 325 milliliters of methanol, previously purged of air-oxygen by passing nitrogen through it for ten minutes and thereto was added a solution of 1.63 grams of potassium bicarbonate in thirty milliliters of water, similarly purged of oxygen. The mixture was allowed to stand at room temperature for a period of five hours in a nitrogen atmosphere, thereupon neutralized with 2.14 milliliters of acetic acid in forty milliliters of water. The mixture was concentrated to approximately one third volume at reduced pressure on a sixty-degree-centigrade water-bath. Thereupon 250 milliliters of water was added and the mixture chilled. The crystalline product was collected on a filter, washed with water and dried to give 2.43 grams (83%) of crude 6α-methyl-9α-fluorohydrocortisone. Recrystallization of the crude material from methanol and Skellysolve B gave pure 6α-methyl-9α-fluorohydrocortisone of melting point 228 to 230 degrees centigrade and rotation $[\alpha]_D$ plus 112 degrees in acetone.

*Analysis.*—Calcd. for $C_{22}H_{31}O_5F$: C, 66.98; H, 7.92; F, 4.82. Found: C, 67.20; H, 8.01; F, 5.47.

An additional amount of product (0.24 gram, 8.2%) of 6-methyl-9α-fluorohydrocortisone was obtained by saturating the filtrate with sodium chloride, extracting with methylene chloride, drying the extracts over sodium sulfate, evaporating and recrystallizing the thus-obtained residue from benzene-methanol.

EXAMPLE 7

*6α-methyl-9α-fluoro-17α,21-dihydroxy-4-pregnene-3,11,20-trione (6α-methyl-9α-fluorocortisone)*

In the same manner given in Example 6, hydrolyzing with sodium carbonate in ethanol solution in a nitrogen atmosphere 6α - methyl - 9α - fluoro - 17α,21-dihydroxy-4-pregnene-3,11,20-trione 21-acetate yielded 6α-methyl-9α-fluoro-17α,21-dihydroxy-4-pregnene - 3,20 - dione (6α-methyl-9α-fluorocortisone).

EXAMPLE 8

*6α-methyl-9α-fluoro-11β,17α,21 - trihydroxy - 4-pregnene-3,20-dione 21-propionate (6α-methyl-9α-fluorohydrocortisone 21-propionate)*

A solution was prepared containing fifty milligrams of 6α-methyl-9α-fluoro-11β,17α,21 - trihydroxy - 4-pregnene-3,20-dione in one milliliter of pyridine and one milliliter of propionic anhydride. The solution was allowed to stand at room temperature for a period of 21 hours and was thereupon poured into ten milliliters of water. The reaction mixture was then extracted with three ten-milliliter portions of methylene chloride, the methylene chloride extracts were combined, washed with water, dried over anhydrous sodium sulfate and evaporated to give a residue which was recrystallized from ethyl acetate to give pure 6α-methyl-9α-fluoro-11β,17α,21-trihydroxy-4-pregnene-3,20-dione 21-propionate.

EXAMPLE 9

*6α-methyl-9α-fluoro-11β,17α,21 - trihydroxy - 4-pregnene-3,20-dione 21-benzoate (6α-methyl-9α-fluorohydrocortisone 21-benzoate)*

A solution was prepared containing 900 milligrams of 6α-methyl-9α-fluoro-11β,17α,21-trihydroxy-4 - pregnene-3,20-dione in one milliliter of benzoyl chloride. The mixture was allowed to stand overnight for a period of eighteen hours and was thereupon diluted with fifty milliliters of water. The water solution was extracted with three ten-milliliter portions of methylene chloride, the methylene chloride fractions combined, washed with water, dried over anhydrous sodium sulfate and evaporated to give a residue. This residue was recrystallized from methanol to give 6α-methyl-9α-fluoro-11β,17α,21-trihydroxy-4-pregnene-3,20-dione 21-benzoate.

EXAMPLE 10

*6α-methyl-9α-fluoro-11β,17α,21-trihydroxy - 4 - pregnene-3,20-dione 21-hemisuccinate (6α-methyl-9α-fluorohydrocortisone 21-hemisuccinate)*

A solution was prepared containing 0.5 gram of succinic anhydride, 0.1 gram of 6α-methyl-9α-fluoro-11β,17α,21-trihydroxy-4-pregnene-3,20-dione in five milliliters of pyridine. This solution was allowed to stand overnight for a period of twenty hours, was thereupon diluted with water and the mixture refrigerated and filtered. The precipitate thus collected on filter paper was recrystallized two times from methanol to give 6α-methyl-9α-fluoro - 11β,17α,21 - trihydroxy - 4 - pregnene-3,20-dione 21-hemisuccinate.

EXAMPLE 11

6α-methyl-9α-fluoro-11β,17α,21-trihydroxy - 4 - pregnene-3,20-dione 21-hemisuccinate sodium salt (6α-methyl-9α-fluorohydrocortisone 21-hemisuccinate sodium salt)

Sodium hydroxide solution (0.1 Normal) was slowly added to a stirred solution of 100 milligrams of 6α-methyl-9α-fluoro - 11β,17α,21 - trihydroxy - 4 - pregnene-3,20-dione 21-hemisuccinate, dissolved in two milliliters of acetone, until the pH rose to about 7.4. During the addition of sodium hydroxide solution, five milliliters of water was also added. The solution was then concentrated at 25 degrees centigrade under vacuum to remove the acetone. The resulting aqueous solution of 6α-methyl-9α-fluoro - 11β,17α,21 - trihydroxy - 4 - pregnene-3,20-dione 21-hemisuccinate sodium salt was filtered, freeze-dried and recrystallized to give pure 6α-methyl-9α-fluoro-11β,17α,21-trihydroxy-4-pregnene - 3,20 - dione 21-hemisuccinate sodium salt.

EXAMPLE 12

In the same manner given in Examples 8 through 10, reacting in pyridine solution at room temperature (twenty to thirty degrees centigrade):

(a) 6α-methyl-9α-fluorohydrocortisone with butyric anhydride yielded 6α-methyl-9α-fluorohydrocortisone 21-butyrate.

(b) 6α-methyl-9α-fluorohydrocortisone with valeric anhydride yielded 6α-methyl-9α-fluorohydrocortisone 21-valerate.

(c) 6α-methyl - 9α - fluorohydrocortisone with lauryl chloride yielded 6α-methyl-9α-fluorohydrocortisone 21-laurate.

(d) 6α-methyl-9α - fluorohydrocortisone with phenylacetyl chloride yielded 6α-methyl-9α-fluorohydrocortisone 21-phenylacetate.

(e) 6α-methyl-9α - fluorohydrocortisone with phenylpropionyl bromide yielded 6α-methyl-9α-fluorohydrocortisone 21-phenylpropionate.

(f) 6α-methyl-9α - fluorohydrocortisone with β-cyclopentylpropionyl chloride yielded 6α-methyl-9α-fluorohydrocortisone 21-(β-cyclopentylpropionate).

(g) 6α-methyl-9α-fluorocortisone with propionic anhydride yielded 6α-methyl-9α-fluorocortisone 21-propionate.

(h) 6α-methyl-9α-fluorocortisone with valeric anhydride yielded 6α-methyl-9α-fluorocortisone 21-valerate.

(i) 6α-methyl-9α-fluorocortisone with benzoyl chloride yielded 6α-methyl-9α-fluorocortisone 21-benzoate.

(j) 6α - methyl - 9α - fluorocortisone with phenylacetyl chloride yielded 6α-methyl-9α-fluorocortisone 21-phenylacetate.

(k) 6α - methyl - 9α - fluorocortisone with undecylenyl chloride yielded 6α-methyl-9α-fluorocortisone 21-undecylenate.

In a manner similar to Examples 8 through 10 and 12, other esters of 6α-methyl-9α-fluorohydrocortisone and 6α-methyl-9α-fluorocortisone are prepared by reacting these steroids with the anhydride or acyl halides or organic carboxylic acids, particularly hydrocarbon carboxylic acids containing from one to twelve carbon atoms, inclusive. Representative 21-esters thus prepared include in particular, besides the before-mentioned examples, the butyrates, isobutyrates, valerates, isovalerates, hexanoates, heptanoates, octanoates, benzoates, phenylacetates, phenylpropionates, β-cyclopentylpropionates, tertiary butylacetates, toluates, 2-furoates, benzenesulfonates, toluenesulfonates, and the like of 6α-methyl-9α-fluorohydrocortisone and 6α-methyl-9α-fluorocortisone. In the same manner 21-esters of the 6β-methyl epimers and the 21-esters of the 6α- and 6β-alkyl- and aryl analogues of these compounds can be prepared.

Treating the 6-methyl-9α-halohydrocortisones and -cortisones, wherein the halogen atom is chlorine, bromine or iodine, with an acylating agent selected from halides or anhydrides of organic carboxylic acids, especially hydrocarbon carboxylic acids containing from one to twelve carbon atoms, inclusive, preferably at room temperature in pyridine solution produces the corresponding 21-esters of 6-methyl-9α-halohydrocortisone and 6-methyl-9α-halohydrocortisone and 6-methyl-9α-halocortisone.

The starting 6α-methyl-9α-halohydrocortisones and -cortisones wherein the halogen is chlorine, bromine or iodine are produced by procedures known in the art, such as reacting the 6α-methyl-17α,21-dihydroxy-4,9(11)-pregnadiene-3,20-dione 21-ester (of Example 1) with N-bromo-, N-chloro- or N-iodosuccinimide in the presence of an acid as shown in Example 2 to give the corresponding 6 - methyl-9α-halo-11β,17α,21-trihydroxy-4-pregnene-3,20-dione 21-ester. Mild acid hydrolysis with dilute sulfuric acid at room temperature produces the corresponding free triol, 6-methyl-9α-halohydrocortisone.

Oxidation of the 6-methyl-9α-halo-11β,17α,21-trihydroxy-4-pregnene-3,20-dione 21-ester with chromic anhydride yields the 6-methyl-9α-halocortisone 21-ester which by acid hydrolysis as mentioned above gives the free alcohol, 6-methyl-9α-halocortisone.

EXAMPLE 13

6α-methyl-9α-fluorohydrocortisone from 9α-fluorohydrocortisone (a) 9α-FLUOROHYDROCORTISONE-3,20-BIS-(ETHYLENE KETAL)

To a solution of ten grams of 9α-fluorohydrocortisone acetate in 400 milliliters of ethylene glycol was added 300 milligrams of para-toluenesulfonic acid The solution was refluxed at a temperature of 70 to 75 degrees centigrade at two to three-milliliters pressure. The distillation was continued for a period of three to three and one half hours and during this period approximately 100 milliliters of distillate was removed gradually. Thereafter the solution was cooled and 800 milliliters of water was added. The mixture was then made alkaline with sodium bicarbonate and extracted three times with a total of 300 milliliters of methylene dichloride. The organic layer was washed with water, dried over anhydrous sodium sulfate, a few drops of pyridine added, and the solution chromatographed on 800 grams of Florisil anhydrous magnesium silicate. The following fractions of 1600 milliliters each were removed:

TABLE II

| Fraction | Solvent | Weight in Milligrams |
|---|---|---|
| 1 | Skellysolve B-acetone 90:10 | 54 |
| 2 | do | 126 |
| 3 | do | 192 |
| 4 | do | 227 |
| 5 | Skellysolve B-acetone 85:15 | 409 |
| 6 | do | 300 |
| 7 | do | 84 |
| 8 | do | 164 |
| 9 | Skellysolve B-acetone 80:20 | 666 |
| 10 | do | 725 |
| 11 | do | 573 |
| 12 | do | 468 |
| 13 | Skellysolve B-acetone 70:30 | 1,143 |
| 14 | do | 917 |
| 15 | do | 560 |

Fractions 13 to 15 were combined, evaporated and the residue recrystallized from ethyl acetate containing pyridine and dried to give 540 milligrams of 9α-fluorohydrocortisone-3,20-bis-(ethylene ketal), of melting point 187.5 to 189 degrees centigrade. It should be noted that in this ketalization operation the 21-ester group is saponified. Two recrystallizations from ethyl acetate gave pure 9α-fluorohydrocortisone 3,20-bis-(ethylene ketal) of melting point 203 to 205 degrees centigrade.

*Analysis.*—Calcd. for $C_{25}H_{38}O_7F$: C, 63.94; H, 8.16. Found: C, 64.23; H, 8.06.

(b) 5α,6α-OXIDO-9α-FLUORO-11β,17α,21-TRIHYDROXY-ALLOPREGNANE-3,20-DIONE 3,20-BIS-(ETHYLENE KETAL)

To 508.5 milligrams of 9α-fluoro-11β,17α,21-trihydroxy-5-pregnene-3,20-dione 3,20-bis-(ethylene ketal), dissolved in fifty milliliters of ethyl acetate, was added 1.3 millimoles of perbenzoic acid, dissolved in three milliliters of ethyl acetate. After two days of standing 1.06 mole equivalents of perbenzoic acid had been consumed according to iodometric titration. The reaction mixture was then washed twice with saturated sodium bicarbonate, once with water, dried over anhydrous sodium sulfate and chromatographed over fifty grams of Florisil anhydrous magnesium silicate, taking fractions of 100 milliliters each as follows in Table III:

TABLE III

| Fraction | Solvent | Weight in Milligrams |
|---|---|---|
| 1 | Skellysolve B-acetone 90:10 | 2 |
| 2 | do | 18 |
| 3 | do | 35 |
| 4 | do | 42 |
| 5 | do | 25 |
| 6 | Skellysolve B-acetone 85:15 | 15 |
| 7 | do | 12 |
| 8 | do | 10 |
| 9 | Skellysolve B-acetone 80:20 | 8 |
| 10 | do | 8 |
| 11 | do | 21 |
| 12 | do | 42 |
| 13 | Skellysolve B-acetone 70:30 | 93 |
| 14 | do | 86 |
| 15 | do | 63 |
| 16 | do | 20 |

Fractions 12 through 15 were combined and crystallized from ethyl acetate containing pyridine to give 210 milligrams of pure 5α,6α-oxido-9α-fluoro-11β,17α,21-trihydroxyallopregnane-3,20-dione 3,20-bis-(ethylene ketal) of melting point 203 to 205 degrees centigrade.

*Analysis.*—Calcd. for $C_{25}H_{37}O_7F$: C, 64.08; H, 7.96. Found: C, 64.23; H, 8.06.

(c) 5α,11β,17α,21-TETRAHYDROXY-6α-METHYL-9α-FLUOROALLOPREGNANE-3,20-DIONE 3,20-BIS-(ETHYLENE KETAL)

A solution of 1.16 grams of 5α,6α-oxido-9α-fluoro-11β,17α,21-trihydroxyallopregnane-3,20-dione 3,20-bis-(ethylene ketal), dissolved in 165 milliliters of tetrahydrofuran (distilled previously over lithium aluminum hydride), was added dropwise to a four molar solution of 95 milliliters of methyl magnesium bromide in ether. Thereafter 575 milliliters of benzene was added and the reaction mixture was allowed to stir and reflux for a period of 24 hours. After cooling the reaction mixture was poured into 700 milliliters of ice and saturated ammonium chloride solution, stirred therein for a period of thirty minutes and the benzene layer separated. The aqueous layer was extracted with three 200-milliliter portions of ethyl acetate and the extracts added to the benzene. The combined benzene-ethyl acetate extracts were washed with water, dried over anhydrous sodium sulfate, and concentrated to give 1.36 grams of crude solid 5α,11β,17α,21-tetrahydroxy-6α-methyl-9α-fluoroallopregnane-3,20-dione 3,20-bis-(ethylene ketal). This crude material was triturated with ether and thereupon recrystallized from ethyl acetate to give pure 5α,11β,17α,21-tetrahydroxy-6α-methyl-9α-fluoroallopregnane-3,20-dione 3,20-bis-(ethylene ketal).

(d) 5α,11β,17α,21-TETRAHYDROXY-6α-METHYL-9α-FLUOROALLOPREGNANE-3,20-DIONE

To a solution of 500 milligrams of 5α,11β,17α,21-tetrahydroxy-6α-methyl-9α-fluoroallopregnane-3,20-dione 3,20-bis-(ethylene ketal) in 38 milliliters of methanol was added 7.7 milliliters of two normal sulfuric acid. After refluxing the mixture for a period of one hour the solution was made neutral with dilute sodium bicarbonate, concentrated under reduced pressure at 35 to 40 milliliters and refrigerated between zero to five degrees centigrade. After standing at this temperature for a period of eighteen hours the mixture was filtered and the precipitate thus obtained recrystallized from ethyl acetate Skellysolve B-hexanes to give pure 5α,11β,17α,21-tetrahydroxy-6α-methyl-9α-fluoroallopregnane-3,20-dione.

(e) 6α-METHYL-9α-FLUOROHYDROCORTISONE

A solution was prepared containing 320 milligrams of 5α,11β,17α,21-tetrahydroxy-6α-methyl-9α-fluoroallopregnane-3,20-dione, dissolved in eighty milliliters of ethanol denatured with methanol. This solution was purged with oxygen-free nitrogen gas for a period of ten minutes, and thereto was added a similar oxygen purged solution of 3.3 milliliters of 0.1 normal sodium hydroxide solution. The mixture was allowed to stand at room temperature (about 22 to 25 degrees centigrade) for a period of eighteen hours, thereafter acidified with acetic acid and concentrated under reduced pressure to dryness. Crystallization from acetone Skellysolve B hexanes gave 185 milligrams of 6α-methyl-9α-fluorohydrocortisone of melting point 208 to 212 degrees centigrade. This product was recrystallized twice from acetone-Skellysolve B to give an analytical sample of pure 6α-methyl-9α-fluorohydrocortisone of melting point 228 to 230 degrees centigrade and rotation $[\alpha]_D$ plus 112 degrees in acetone.

EXAMPLE 14

*1-dehydro-6α-methyl-9α-fluorohydrocortisone (6α-methyl-9α-fluoro-11β,17α,21-trihydroxy-1,4-pregnadiene-3,20-dione)*

Three 100-milliliter portions of a medium, in 250-milliliter Erlenmeyer flasks, containing one percent glucose, two percent corn steep liquor (sixty percent solids) and tap water, were adjusted to a pH of 4.9. This medium was sterilized for 45 minutes at fifteen pounds per square inch pressure and inoculated with a one to two day growth of *Septomyxa affinis* A.T.C.C. 6737. The Erlenmeyer flask was shaken at room temperature (about 26 to 28 degrees centigrade) for a period of three days. At the end of this period this 300-milliliter volume was used as an inoculum for five liters of the same glucose-corn steep liquor medium which in addition contained five milliliters of an antifoam compound (a mixture of lard oil and octadecanol). The fermentor was placed into the water-bath, adjusted to 28 degrees centigrade and the contents stirred (300 r.p.m.) and aerated (0.3 liter air to five liters of beer). After twenty hours of incubation, when a good growth had been developed, one gram of 6α-methyl-9α-fluorohydrocortisone plus one half gram of 3-ketobisnor-4-cholen-22-al, dissolved in sixteen milliliters of dimethylformamide was added and the incubation carried out at the same temperature (28 degrees centigrade) and aeration for a period of 72 hours (final pH 8.3). The mycelium was filtered off and extracted with three 200-milliliter portions of acetone. The beer was extracted with three one-liter portions of methylene chloride and thereupon the extracts of the beer and acetone were combined, dried over anhydrous sodium sulfate and evaporated and the resulting residue chromatographed over a Florisil anhydrous magnesium silicate column. The column was packed with 100 grams of Florisil and was developed with five 200-milliliter fractions each of methylene chloride, Skellysolve B hexane-acetone mixtures of 9:1, 8:2, 7:3, 1:1, and methanol. The fraction eluted with Skellysolve B acetone (8:2) was twice recrystallized from acetone to give 315 milligrams of 6α-methyl-9α-fluoro-11β,17α,21-trihydroxy-1,4-pregnadiene-3,20-dione of melting point 243 to 250 degrees centigrade with decomposition and rotation $(\alpha)_D$ plus 93 degrees in acetone.

Analysis.—Calcd. for $C_{22}H_{29}O_5F$: C, 67.33; H, 7.45; F, 4.84. Found: C, 67.48; H, 7.61; F, 5.02.

In a manner similar to Example 14 using other species of genus Septomyxa under fermentation conditions known in the art preferably in the presence of a promoting agent such as 3-ketobisnor-4-cholen-22-al, progesterone, 11β,21-dihydroxy-1,4,17(20) - pregnatrien-3-one, 3-keto-bisnor-4-cholenic acid and the like, produces from 6-methyl-9α-fluorohydrocortisone the 1-dehydro-6-methyl-9α-fluorohydrocortisone. Instead of a species of the genus Septomyxa, species of other genera such as Corynebacterium, Didymella, Calonectria, Alternaria, Colletotrichum, Cyclindrocarpon, Ophiobolus, Fusarium, Listeria, Erysipelothrix, Mycobacterium, Tritothecium, Leptosphaeria, Cucurbitaria, Nocardia, and enzymes of fungi of the family Tuberculariaceae can be used to introduce a Δ¹-bond into 6-methyl-9α-fluorohydrocortisone.

Instead of 6-methyl-9α-fluorohydrocortisone, 21-esters thereof can be used such as the 21-acetate, propionate, butyrate, isobutyrate, and the like. However, in these cases the ester group is generally saponified during the fermentation process.

EXAMPLE 15

*1-dehydro - 6α - methyl - 9α-fluorohydrocortisone acetate from 6α-methyl-9α-fluorohydrocortisone acetate*

A mixture of 100 milligrams of 6α-methyl-9α-fluorohydrocortisone acetate, dissolved in six milliliters of tertiary butyl alcohol and 0.55 milliliter of acetic acid was heated together with thirty milligrams of selenium dioxide to 75 degrees centigrade under stirring for a period of 24 hours. Thereafter another thirty-milligram portion of selenium dioxide was added and the mixture heated to 75 degrees centigrade under continuous stirring for a further period of 24 hours. The mixture was then cooled, filtered to remove the selenium dioxide and evaporated. The residue was recrystallized from acetone Skellysolve B four times to give pure 1-dehydro-6α-methyl-9α-fluorohydrocortisone acetate of melting point 237 to 239 degrees centigrade and rotation $[\alpha]_D$ plus 87 degrees in acetone. The infrared absorption measured in Nujol mineral oil was as follows: hydroxyl, 3430 cm.$^{-1}$; 21-acetoxy-20-keto, 1735, 1717 cm.$^{-1}$; conjugated 3-keto group, 1658 cm.$^{-1}$; Δ$^{1,4}$-double bonds, 1615, 1610 cm.$^{-1}$; acetate C—O-bond, 1270, 1239 cm.$^{-1}$.

Analysis.—Calcd. for $C_{24}H_{31}O_6F$: C, 66.34; H, 7.19; F, 4.37. Found: C, 65.94; H, 6.95; F, 4.72.

It is to be understood that the invention is not to be limited to the exact details of operation or exact compounds shown and described, as obvious modifications and equivalents will be apparent to one skilled in the art, and the invention is therefore to be limited only by the scope of the appended claims.

I claim:

1. A steroid selected from the group consisting of 6-methyl-9α-fluorohydrocortisone, 6-methyl-9α-fluorocortisone, 6-methyl-9α-fluorohydrocortisone 21-acylate and 6-methyl-9α-fluorocortisone 21-acylate wherein the acyl group is the acyl radical of a hydrocarbon carboxylic acid containing from one to twelve carbon atoms, inclusive.
2. 6α-methyl-9α-fluorohydrocortisone.
3. 6α-methyl-9α-fluorohydrocortisone 21-acetate.
4. 6α-methyl-9α-fluorocortisone.
5. 6α-methyl-9α-fluorocortisone 21-acetate.

References Cited in the file of this patent

UNITED STATES PATENTS

| 2,409,798 | Reichstein | Oct. 22, 1946 |
| 2,728,783 | Graber | Dec. 27, 1955 |
| 2,732,383 | Bernstein | Jan. 24, 1956 |
| 2,842,568 | Herz | July 8, 1958 |
| 2,852,511 | Fried | Sept. 16, 1958 |

OTHER REFERENCES

Fried et al.: J.A.C.S. 76, pages 1455–1456, March 5, 1954.

Hogg et al.: J.A.C.S. 77, pages 6401–6402, Dec. 5, 1955.

UNITED STATES PATENT OFFICE
CERTIFICATE OF CORRECTION

Patent No. 2,928,851                                                           March 15, 1960

George B. Spero

It is hereby certified that error appears in the printed specification of the above numbered patent requiring correction and that the said Letters Patent should read as corrected below.

Column 2, line 18, for the numeral "37" read -- 35 --; column 5, line 13, for "fitration" read -- filtration --; column 12, line 66, for "conatining" read -- containing --; column 14, line 52, for "900 milligrams" read -- 200 milligrams --; column 16, line 9, strike out "and 6-methyl-9α-halohydrocortisone".

Signed and sealed this 6th day of September 1960.

(SEAL)
Attest:

ERNEST W. SWIDER
Attesting Officer

ROBERT C. WATSON
Commissioner of Patents